US009629185B1

(12) United States Patent
Gluckman et al.

(10) Patent No.: US 9,629,185 B1
(45) Date of Patent: Apr. 18, 2017

(54) ESTABLISHING TEXT COMMUNICATION SESSIONS BETWEEN WIRELESS MOBILE DEVICES AND EMERGENCY CALL CENTERS (71) Applicant: TRITECH SOFTWARE SYSTEMS, San Diego, CA (US)

(72) Inventors: Sidney P. Gluckman, Lone Tree, CO (US); John T. Zaharychuk, San Diego, CA (US); Erik C. Loberg, Carlsbad, CA (US); Lisa A. Henderson, Martin, TN (US)

(73) Assignee: TRITECH SOFTWARE SYSTEMS, San Diego, CA (US)

( * ) Notice: Subject to any disclaimer, the term of this patent is extended or adjusted under 35 U.S.C. 154(b) by 204 days.

(21) Appl. No.: 14/476,683

(22) Filed: Sep. 3, 2014

(51) Int. Cl.
H04M 11/04 (2006.01)
H04W 76/00 (2009.01)
H04W 4/14 (2009.01)
H04L 29/06 (2006.01)

(52) U.S. Cl.
CPC ..... *H04W 76/007* (2013.01); *H04L 29/06197* (2013.01); *H04L 29/06326* (2013.01); *H04W 4/14* (2013.01)

(58) Field of Classification Search
CPC ..... H04W 76/007; H04W 4/14; H04W 84/18; H04L 29/08108; H04M 7/006; H04M 11/04; H04M 3/5307; H04M 3/523; G06Q 10/10
USPC ........ 455/404.1, 414.1–414.4, 466; 370/259, 370/310.2; 379/37, 88.13, 265.02; 709/204
See application file for complete search history.

(56) References Cited

U.S. PATENT DOCUMENTS

| | | | | |
|---|---|---|---|---|
| 5,388,147 A * | 2/1995 | Grimes | ................ | G08B 25/016 379/37 |
| 8,190,687 B1 * | 5/2012 | Chen | ....................... | H04W 4/22 709/204 |
| 8,538,468 B2 | 9/2013 | Daly | | |
| 2003/0043974 A1 * | 3/2003 | Emerson, III | .......... | H04L 29/06 379/88.13 |
| 2005/0049879 A1 * | 3/2005 | Audu | ...................... | G10L 15/26 704/277 |
| 2005/0201359 A1 * | 9/2005 | Nelson | ................ | H04L 12/6418 370/352 |
| 2008/0189721 A1 * | 8/2008 | Buchanan | ............. | G06F 9/4812 719/318 |
| 2010/0241686 A1 | 9/2010 | Deng et al. | | |
| 2010/0251124 A1 * | 9/2010 | Geppert | .............. | G06F 3/04817 715/734 |
| 2010/0296634 A1 * | 11/2010 | Schulzrinne | ......... | H04M 3/5116 379/45 |
| 2011/0009086 A1 * | 1/2011 | Poremba | .............. | H04M 3/5116 455/404.1 |
| 2012/0236760 A1 * | 9/2012 | Ionescu | ................... | H04W 4/22 370/259 |
| 2013/0219017 A1 | 8/2013 | Bakker et al. | | |

* cited by examiner

Primary Examiner — Steve D Agosta
(74) Attorney, Agent, or Firm — Pillsbury Winthrop Shaw Pittman LLP (57) ABSTRACT Systems and methods for establishing text communication sessions between wireless mobile devices and emergency call centers are presented herein. The text communications may be established by effectuating changes to a media type specified in session invitation messages, response messages, and/or other messages that are relayed between a given wireless mobile device and an emergency call center.

18 Claims, 7 Drawing Sheets

ESTABLISHING TEXT COMMUNICATION SESSIONS BETWEEN WIRELESS MOBILE DEVICES AND EMERGENCY CALL CENTERS

FIELD OF THE DISCLOSURE

This disclosure relates to establishing text communication sessions between wireless mobile devices and emergency call centers.

BACKGROUND

Conventionally, emergency phone calls (e.g., voice calls) are answered by an emergency call center, such as, e.g., a public safety answering point (PSAP). The emergency call center may use an Automated Call Distribution (ACD) system that routes the incoming voice call over an emergency communications network to an appropriate end terminal and/or destination. Operators, also referred to as dispatchers or emergency dispatchers, answer the calls at the end destinations to establish the voice communication session between the caller and the emergency call center. The voice communication sessions may be established based on protocols that are known to, and/or otherwise standardized by the emergency call center, ACD system, the calling device (e.g., wireless mobile device, and/or other device), and/or other devices and/or components used during voice communication sessions. For example, the ACD system and/or other devices or components may use and/or otherwise recognize Real-time Transport Protocol (RTP) (e.g., used for voice calls), RTP Control Protocol (RTCP), Internet Protocol, and/or other protocols.

Once the call session is established, the operators may gather and/or attempt to gather information during emergency calls, including, but not limited to, the name of the caller, the nature of the emergency, the location of the emergency and/or the caller, and/or other emergency information. Operators may determine the appropriate type of first response, including, but not limited to, police, fire, medical, and/or other types of first response. Operators may contact a dispatcher for the determined type, e.g., a police dispatcher, fire dispatcher, medical dispatcher, and/or other type of dispatcher. In turn, the police dispatcher may contact appropriate emergency responders, such as one or more police officers that are on duty and, e.g., near the location of the emergency.

SUMMARY

One aspect of the disclosure relates to a system configured to establish text communication sessions between emergency calling devices and an emergency call center. An emergency calling device may include, for example, a wireless mobile device, and/or other considerations. In accordance with one or more implementations, the system may allow the emergency call center and/or ACD system to properly handle and/or recognize incoming text communications without requiring substantially any modification and/or adjustment to the existing emergency communications network and/or ACD system.

For example, the emergency call center and/or the ACD system used by the emergency call center may be configured to recognize and/or otherwise handle only incoming emergency calls that are specified as being the audio media type (e.g., a voice call, RTP call, and/or other communications). The processes of recognizing and/or confirming that an incoming communication is of the proper media type may be referred to as a media type "negotiation". This negotiation may be performed during an initiation of a session. The initiation of a session may be performed prior to the actual transmission of the voice, text, and/or other media (e.g., the call audio, the body of a text message, a picture message, and/or other considerations). The negotiation may be accomplished during a "handshake" that may be performed between the emergency calling device and the emergency call center. As part of the handshake, one or more messages may be sent back and forth. This message, or messages, may be used to establish an accepted media type for the communication session. As such, absent one or more implementations of the system that will be described in more detail herein, the emergency call center and/or ACD system may reject incoming text communications (or other media types, such as picture, video, and/or other considerations) since, during the session initiation (e.g., handshake), the media type negotiation process may determine that the incoming communication is specified as an unrecognizable media type (e.g., a textual media type, picture media type, video media type, and/or other considerations).

As a solution, one or more implementations of the system describe implementing one or more processors and/or processing devices used to relay messages and/or information communicated between the emergency calling devices and/or the emergency call centers. It is noted that the recitation of an "emergency call center" and/or "emergency call centers" may herein also encompass an ACD system that may be incorporated with and/or otherwise employed by a given emergency call center. In accordance with one or more implementations, the system may include one or more processors configured to execute one or more computer program components. The computer program components may include a receiving component, a negotiation component, a transmission component an establishing component, and/or other components.

The receiving component may be configured to receive session invitation messages, incoming text messages (and/or other messages such as picture messages, video messages, and/or other considerations), outgoing text messages (or other outgoing media), response messages, acknowledgement messages, and/or other messages and/or other information. For example, the receiving component may be configured to receive messages transmitted from an emergency calling device over a network (e.g., a cellular network, the Internet, emergency communications network, and/or other considerations). In particular, the messages and/or other information transmitted by the emergency calling devices may include messages that may be used to initiate a communication session (herein referred to as "session invitation messages"), acknowledgment messages, and/or other messages and/or information.

The receiving component may be configured to receive messages transmitted from an emergency call center over a network. In particular, the messages and/or other information transmitted by the emergency call centers may include messages transmitted in response to the session invitation messages (herein referred to as "response messages"), and/or other messages and/or information.

The negotiation component may be configured to effectuate one or more changes in the messages received by the receiving component. The negotiation component may be configured to effectuate changes in the media type specified by the received messages. For example, a first session invitation message may be received by the receiving component. The first session invitation message may be used to establish a first session between a first wireless mobile device (e.g., and/or other emergency calling device) and an emergency call center. The first session invitation message may specify that incoming emergency communication for the first session is of a textual media type (or other media type). The negotiation component may be configured to effectuate a change in the first session invitation message. The change may include a change to the media type specification in the first session invitation message, and/or other changes. The media type specification may be changed such that the first session invitation message instead specifies that the incoming emergency communication for the first session is of an audio media type. This change may be made without actually changing form, substance, and/or any other aspect of the incoming content within the communication itself.

As another illustrative example, a first response message transmitted from the emergency call center may be received by the receiving component. The first response message may be received responsive to the first session invitation message being transmitted to the emergency call center. The first response message may specify the audio media type as the accepted media type for the first session. The negotiation component may be configured to effectuate a change in the first response message. This change may include a change in the media type specified in the first response message. For example, the first response message may be changed to instead specify the textual media type (or other media type) as the accepted media type for incoming emergency communication received at the emergency call center during the first session.

The transmission component may be configured to effectuate transmission of messages and/or other information to the emergency calling devices, emergency call centers, and/or to other destinations. The transmission may be effectuated over one or more networks. The one or more networks may include a cellular network, the Internet, an emergency communications network, and/or other considerations. As an illustrative example, the transmission component may be configured to effectuate transmission of the first session invitation message to the emergency call center. The first session invitation may be transmitted after the message has been changed to specify the audio media type for the first session. The first session invitation message may be transmitted to the emergency call center over the Internet, an emergency communications network, and/or other network.

The transmission component may be configured to effectuate transmission of the first response message to the first wireless mobile device over a cellular network, the Internet, and/or other considerations. The first response message may be transmitted after the message has been changed to specify the textual media type (or other media type) as the accepted media type for the first session.

The establishing component may be configured to establish the communication sessions and/or confirm that the communication sessions are successfully established once the "handshake" has been completed and/or based on other conditions. For example, the establishing component may be configured to establish and/or confirm the establishment of the first session, and/or other considerations.

In some implementations, the negotiation of the media type as presented above may result in the incoming text communications (and/or picture, video, and/or other considerations) "appearing" to the emergency call center as the audio media type. As such, the incoming text communications may be queued, optionally (re)ordered in accordance with priority considerations, and distributed and/or routed to emergency operators by the ACD system, similar to handling of voice calls of the audio media type. Priority considerations may be based on information related to one or more incoming emergency communications, one or more emergency communications that are in the process of being answered by an emergency operator, one or more emergency communications that have been answered by an emergency operator, active computer-aided dispatch (CAD) events/incidents, and/or other information. For example, current incidents the system may be aware of may contribute to the priority considerations.

The system may be hosted by and/or implemented on a server. Callers, operators, dispatchers, and/or emergency responders may interact and/or communicate with and/or through the system using client devices disposed at the emergency call centers. Interaction and/or communication may be implemented by telephones, mobile devices, wireless devices, wireless mobile devices, electronic devices, client devices, communication devices, client computing platforms, servers, and/or devices or systems that are combinations thereof. Interaction and/or communication with the system may be implemented over one or more networks, including, but not limited to, emergency communications networks, wired telephone networks, wireless telephone networks, cellular networks, the Internet, and/or one or more other (communications) networks.

The system may include one or more of one or more servers, one or more emergency call centers, and/or other components. The server(s) may be configured to communicate according to a client/server architecture, a peer-to-peer architecture, a distributed architecture, and/or another suitable architecture or combination of architectures.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
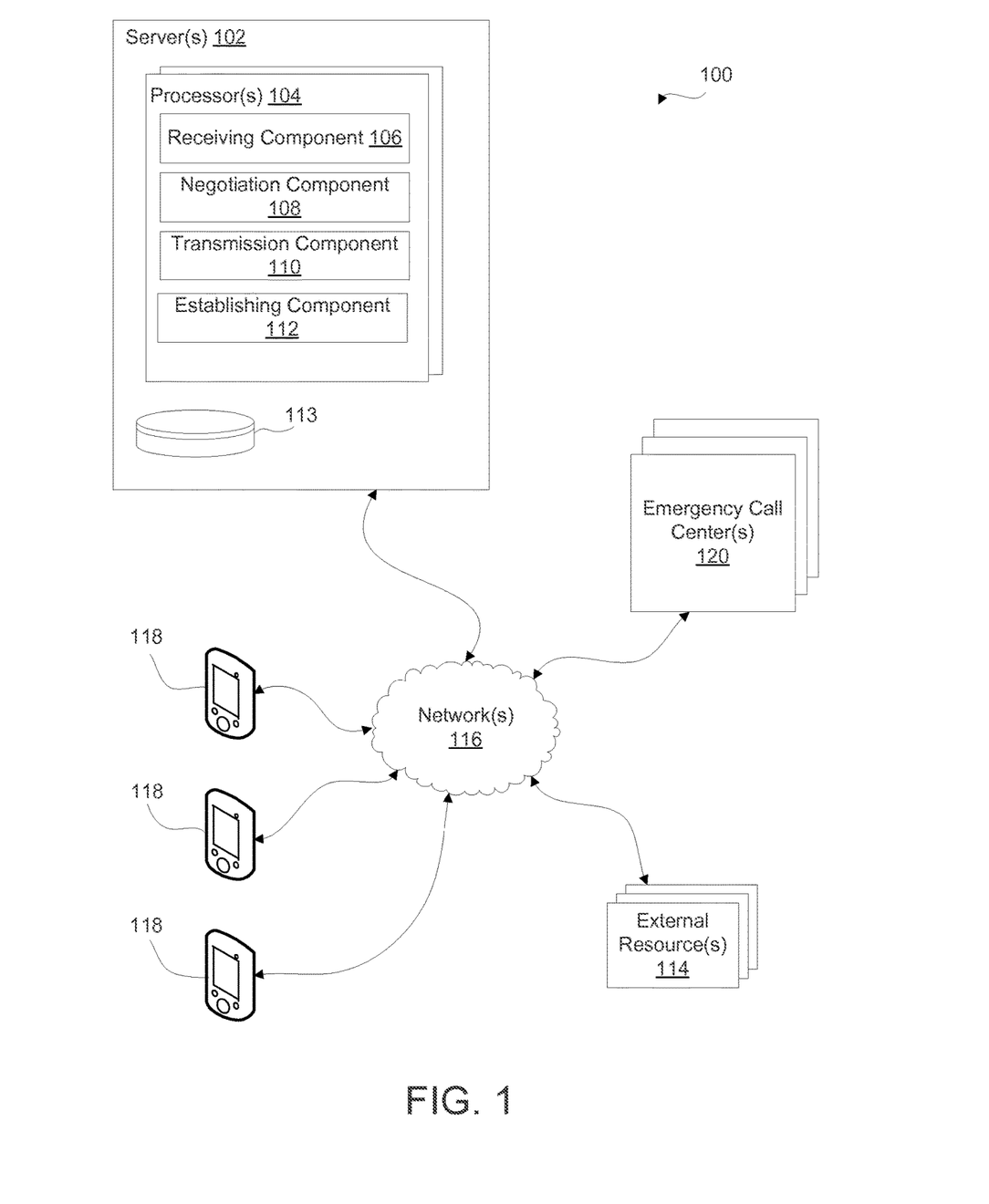
FIG. 1 illustrates a system configured to establish text communication sessions between emergency calling devices and emergency call centers, in accordance with one or more implementations.

FIG. 1 illustrates a system 100 for establishing text (or other media type) communication sessions between one or more emergency calling devices 118 and one or more emergency call centers 120, in accordance with one or more implementations. It is noted that although not shown, the emergency call centers 120 may include and/or may be coupled with an ACD system. The ACD system and/or other component(s) of the emergency call centers 120 may be configured to route incoming communications to an appropriate end terminal and/or destination to be answered by an Operator.

A given emergency calling device 118 may include one or more of a telephone, mobile device, wireless device, wireless mobile device, electronic device, communication device, client computing platform, server, and/or device or system that are combinations thereof. For example, a wireless mobile device may include a cell phone, a Smartphone, a tablet computer, a laptop, and/or other considerations.

Server(s) 102 may be configured to communicate with one or more emergency calling devices 118 according to, e.g., a client/server architecture. Components of system 100 may communicate over one or more networks 116. Communication may use techniques including, but not limited to, wired, wireless, and/or combinations thereof. In some implementations, system 100 may include communication using a peer-to-peer architecture. Users may access system 100 via emergency calling device(s) 118, client devices (not shown) employed by the Operators at the emergency call centers 120, and/or other devices.

Server(s) 102 may include electronic storage 113, one or more processors 104, and/or other components. Server(s) 102 may include communication lines, or ports to enable the exchange of information with one or more networks 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may, at least in part, be implemented by a cloud of computing platforms operating together as server(s) 102. In some implementations, server(s) 102 may be physical server(s). In some implementations, server(s) 102 may be virtual server(s).

In some implementations, server(s) 102, emergency calling device(s) 118, and/or external resources 114 may be operatively linked via one or more electronic communication links. For example, such electronic communication links may be established, at least in part, via the one or more networks 116, including, e.g., the Internet, an emergency communications network, a cellular network, and/or other networks. In some implementations, network(s) 116 may be configured to inspect and/or modify information communicating there through and/or other considerations. In some implementations the inspection and/or modification may be based on the content of the information and/or other considerations.

It will be appreciated that this is not intended to be limiting, and that the scope of this disclosure includes implementations in which server(s) 102, emergency calling device(s) 118, and/or external resources 114 may be operatively linked via some other communication media. In some implementations the server(s) 102 may be implemented, embedded, combined, and/or integrated with one or more emergency call centers 120 to accomplish the functions attributed in this disclosure.

External resources 114 may include sources of information, hosts and/or providers of communication systems outside of system 100, external entities participating with system 100, and/or other resources. In some implementations, some or all of the functionality attributed herein to external resources 114 may be provided by resources included in system 100.

Text messages and/or other communications (e.g., picture, video, and/or other considerations) transmitted between the emergency calling devices 118 and the emergency call centers 120 may be associated with and/or otherwise governed by one or more communication protocols. For example, text messages placed to the emergency call centers 120 may be associated with Message Session Relay Protocol (MSRP) and/or other text-based protocol. When establishing a text communication session using MSRP and/or other messaging protocol, the session may be instantiated using a rendezvous protocol. The rendezvous protocol may be associated with information communicated between a communication originator (e.g., an emergency calling device 118) and the communication recipient (e.g., an emergency call center 120). This information may include session invitations (e.g., a session invitation message), session invitation responses (e.g., response messages), information used in negotiating a media type for the communication session, and/or may include other information. Rendezvous protocol may also be referred to as the "handshaking" process, and/or other considerations. It is noted that the term "session invitation message" may be used to encompass at least the session invitation portion of the rendezvous protocol related communications.

In particular, MSRP communications may be instantiated using Session Description Protocol (SDP), Session Initiation Protocol (SIP), SDP over SIP, and/or other rendezvous methods and/or other considerations. In some implementations, the SIP syntax of an SIP over SDP message may include information related to a session invitation (e.g., a session invitation message), an invitation response (e.g., a response message), and/or other information. SDP syntax of an SIP over SDP message may include information associated with specifying a particular media type for a communication session (e.g., in the session invitation message, response message, and/or other messages). The sending and/or receiving of SDP syntax in the session invitation message and/or response message may be employed, at least in part, for negotiating an accepted media type for a given communication session between the emergency calling devices 118 and the emergency call center 120. For example, an emergency calling device 118 associated with a text message being placed to the emergency call center 120 based on MSRP protocol and/or other protocol may specify, using SDP syntax and/or an SDP portion of an SIP over SDP message, the media type for the MSRP-based communication session as the textual media type, and/or other considerations.

Figure 2:
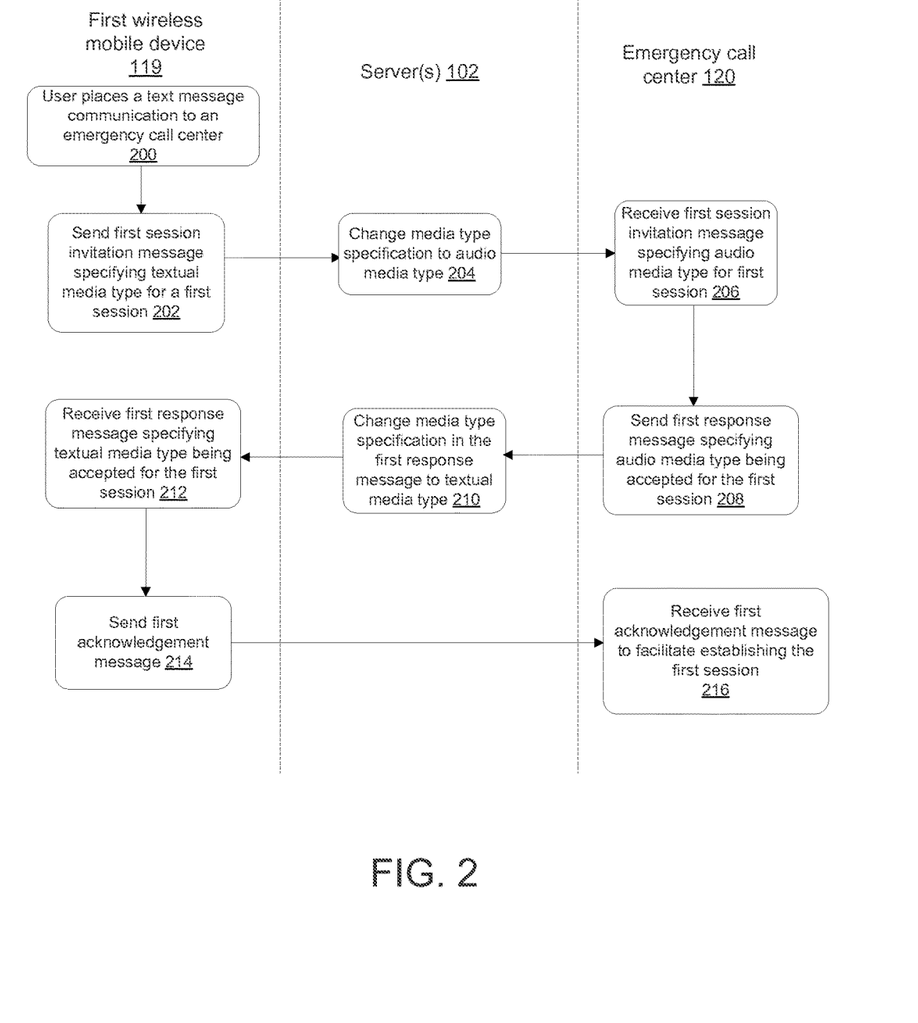
FIG. 2 illustrates a flow diagram of a session initiation process performed between a first wireless mobile device and an emergency call center, in accordance with one or more implementations.

FIG. 2 illustrates a flow diagram of an exemplary session establishing process (e.g., handshake) performed between a first wireless mobile device 119 (and/or other emergency calling device) and an emergency call center 120, in accordance with one or more implementations of the system 100 of FIG. 1. It is noted that FIG. 2 may be provided merely as a descriptive overview of one or more implementations of the system 100 of FIG. 1, while further details may be brought out in the descriptions of FIG. 1 and FIGS. 3-8. With that being said, in FIG. 2, the first wireless mobile device 119 may place an emergency text communication 200 to the emergency call center 120. Following one or more text-based communication protocols, the text message may be preceded by the generation and/or transmission of a session invitation message and/or other information. For example, the first wireless mobile device 119 may generate and/or transmit 202 a first session invitation message. The first session invitation message may specify that the incoming text communication 200 is of the textual media type. The first session invitation message may be received at the server(s) 102 (e.g., receiving component 106 as shown in FIG. 1). In some implementations the first session invitation message may be received over a network, such as the Internet, cellular network, and/or other considerations. Next, a change 204 may be effectuated in the first session invitation message to instead specify that the incoming text communication 200 is of the audio media type, and/or other changes and/or other considerations (e.g., via the negotiation component 108 shown in FIG. 1). At this point, the first session invitation message may then be transmitted to, and received 206 by the emergency call center 120 (e.g., via the transmission component 110 shown in FIG. 1). In some implementations, the first session invitation message may be transmitted over the Internet, an emergency communications network, and/or via other network(s).

Briefly, it is noted that although establishment of text-based communication sessions is described in detail herein, it is to be understood that the same or similar processes features, and/or functions of the system 100 may be similarly used to establish other media based communication sessions, and/or other considerations. As an illustrative example, in some implementations, an incoming emergency communication may be of a video media type and/or other media type (e.g., a video call and/or other considerations). An associated session invitation message may specify that the incoming emergency communication is of the video media type. A change may be effectuated in the session invitation message to instead specify the incoming emergency communication as the audio media type and/or other considerations. Other changes in other messages may be effectuated in accordance with one or more implementations presented herein.

It is further noted that the processes, features, and/or functions presented herein may be implemented in systems other than emergency call networks and/or emergency call centers. For example, any network, service, and/or application that may be limited in the types of media that they support may benefit from the processes, features, and/or functions presented herein. As such, these systems may be adapted and/or otherwise configured to handle a much wider range of media with little or no modifications required.

Returning to the example shown in FIG. 2, next, the emergency call center 120 may generate and/or otherwise transmit 208 a first response message directed to the first wireless mobile device 119. The first response message may confirm and/or otherwise specify the audio media type as the accepted media type for the session. The first response message may be received at the server(s) 102 (e.g., the reception component 106 shown in FIG. 1). A change may then be effectuated 210 in the first response message to instead specify the textual media type as the accepted media type for the session. The first response message may then be transmitted to the first wireless mobile device 119.

In some implementations, the first wireless mobile device 119 may generate and/or otherwise transmit 214 a first acknowledgment message back to the emergency call center 120. The first acknowledgment message may or may not require a change to a media type specification (e.g., the acknowledgment message may not include a media type specification and/or may be transmitted agnostically over one or more networks). Reception 216 of the first acknowledgment message at the emergency call center 120 may comprise a final communication associated with establishing the communication session.

Returning to FIG. 1, the server(s) 102 may be configured to execute one or more computer program components. The computer program components may include one or more of a receiving component 106 a negotiation component 108 a transmission component 110, an establishing component 112, and/or other components.

The receiving component 106 may be configured to receive messages and/or information from the emergency calling devices 118, networks 116, emergency call centers 120, external resources 114, and/or other components. The receiving component may be configured to receive session invitation messages, and/or other information. The session invitation messages may be transmitted from the emergency calling devices 118, and/or other considerations. The receiving component 106 may be configured to receive response messages, and/or other information. The response messages may be transmitted from the emergency call center(s) 120, and/or other considerations.

Figure 3:
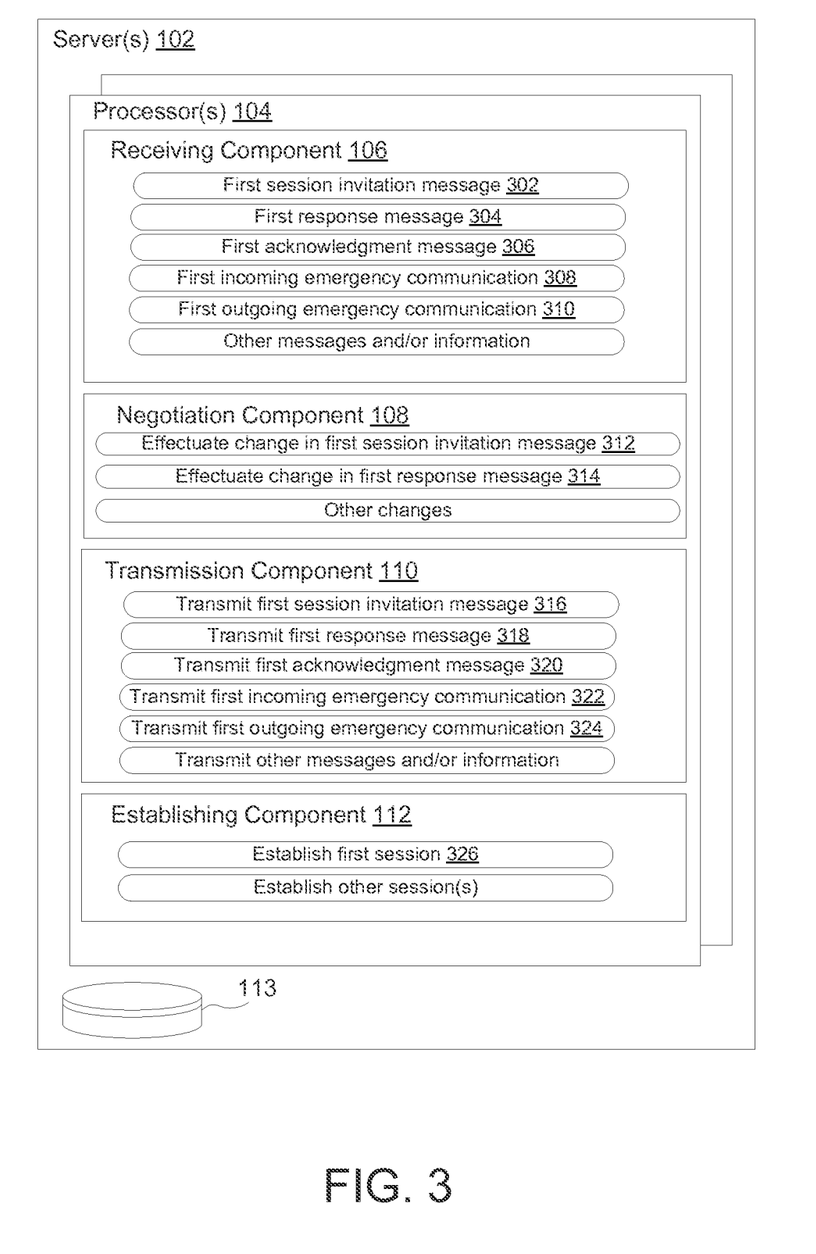
FIG. 3 illustrates an implementation of a server employed in the system of FIG. 1.

As an illustrative example in FIG. 3, the receiving component 106 may be configured to receive a first session invitation message 302 from a first wireless mobile device (e.g., an individual one of the emergency calling devices 118 in FIG. 1), and/or other information. The first session invitation message 302 may be associated with a first incoming emergency communication 308 that may be placed by the first wireless mobile device to an emergency call center. The first session invitation message 302 may be used to establish, at least in part, a first session between the first wireless mobile device and the emergency call center. The first session invitation message 302 may specify the media type of the first incoming emergency communication 308 for the first session. For example, the first incoming emergency communication from the first wireless mobile device may be a text message (e.g., MSRP message). The first session invitation message 302 may specify that the first incoming emergency communication is of the textual media type, and/or other considerations. The first session invitation message 302 may be received via communications routed to and/or from the network(s) 116 of FIG. 1 (e.g., the Internet, a cellular network, and/or other considerations).

The receiving component 106 may be configured to receive a first response message 304 from the emergency call center. The first response message 304 may be received responsive to the first session invitation message 302 being transmitted to and received by the emergency call center. The receiving component 106 may be configured to receive a first acknowledgment message 306 from the first wireless mobile device. The first acknowledgement message 306 may be transmitted by the first wireless mobile device responsive to the first wireless mobile device receiving the first response message 304. The first acknowledgement message 306 may include information that indicates an acknowledgment of the first response message 304 received at the first wireless mobile device, and/or other considerations. For example the first acknowledgement message 306 may include syntax such as "ACK", "ACKNOWLEDGED", and/or other considerations.

The receiving component 106 may be configured to receive the first incoming emergency communication 308 in connection to the first session. The receiving component 106 may be configured to receive a first outgoing communication 310. The first outgoing communication 310 may be a text messaged placed to the first wireless mobile device from the emergency call center. The first outgoing communication 310 may be received responsive to the first incoming emergency communication 308 being transmitted to, and received by, the emergency call center 120. The receiving component 106 may be configured to receive other messages and/or information.

Figure 4:
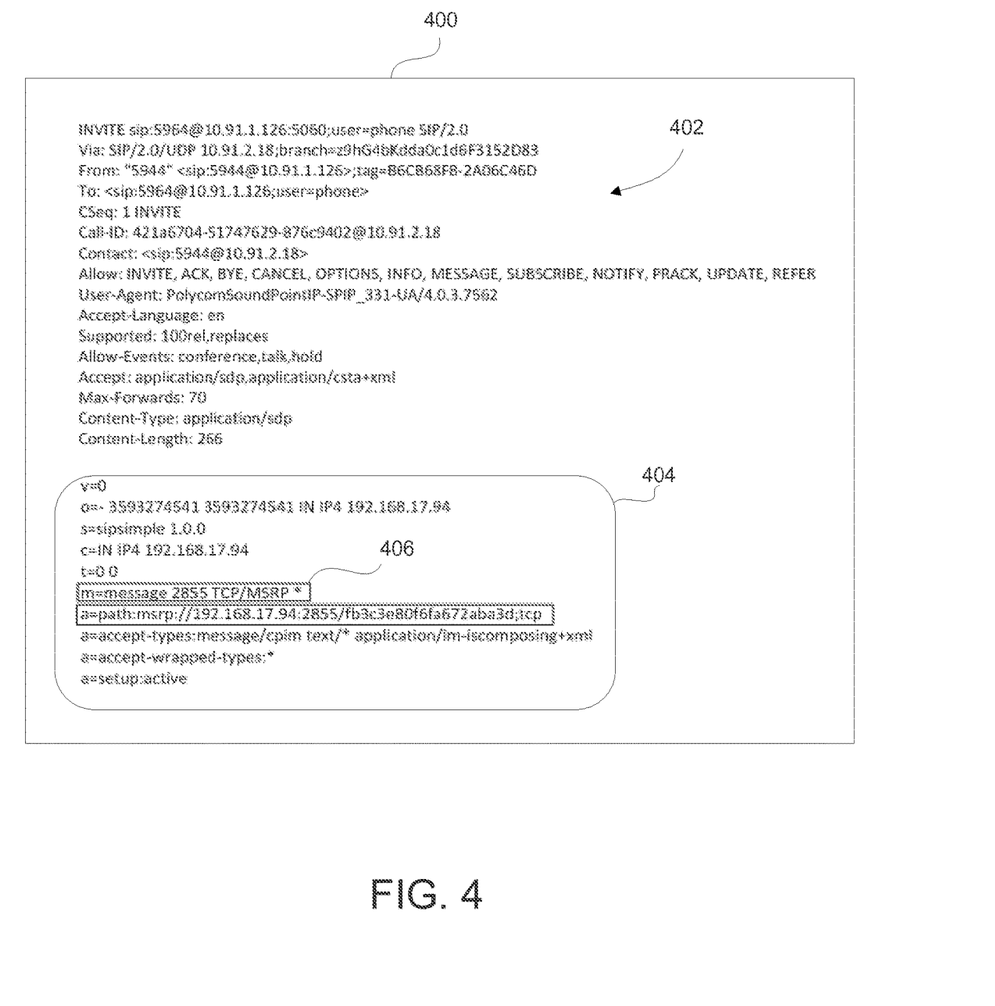
FIG. 4 illustrates a session invitation message sent from a wireless mobile device that specifies the textual media type for an incoming emergency communication, in accordance with one or more implementations.

As a further illustrative example in FIG. 4, an exemplary implementation of a session invitation message 400 is shown. The session invitation message 400 illustrates an example of a SDP over SIP message that may be included, at least in part, in establishing a text communication session based on MSRP. The session invitation message 400 may be defined, at least in part, by SIP syntax 402, SDP syntax 404, and/or other information. The SIP syntax 402 may include information used to invoke a session invitation. For example, the first line of SIP syntax 402 may include the term "INVITE" and/or other information used to designate the session invitation message 400 as an invitation-related message. Other information determined by the SIP syntax 402 may include, for example, "TO" and/or "FROM" information that specifies the origination and/or destination of the session invitation message 400, and/or other information. Other information that may be included in the SIP syntax 402 of the session invitation message 400 may include information developed and standardized in accordance with Request For Comments (RFC) publication by the Internet Engineering Task Force (IETF) Section 3261, and/or other information. However, it is noted that other protocols and/or communication methods may include other and/or additional information to facilitate a session invitation, and may be considered for other implementations of the system 100.

The SDP syntax 404 of the session invitation message 400 may include information and/or particular syntax that determine, at least in part, a media type specification 406 for communications associated with the session invitation message 400 and/or other information. The SDP syntax 404 may include information in accordance with RFC 4566 and/or other information. For example, the information associated with the media type specification 406 may be determined based on information associated with an "m-line" (e.g., shown as "m= . . . ") and/or other identifier, and/or other considerations. In particular, the media type specification 406 in the session invitation message 400 may specify the textual media type in accordance with MSRP communications (e.g., "m=message . . . MSRP"), and/or other considerations. Other information that may be included in the SDP syntax 404 may include "path" information (e.g., shown in the "a-line"), information related to the accepted media type (e.g., shown in the "a-line"), and/or other information.

It is noted that the depiction of the session invitation message 400 in FIG. 4 is for illustrative purposes only. It is noted that other protocols and/or methods may determine and/or specify a media type and/or other information in other ways and/or using different syntax and/or identifiers.

Figure 6:
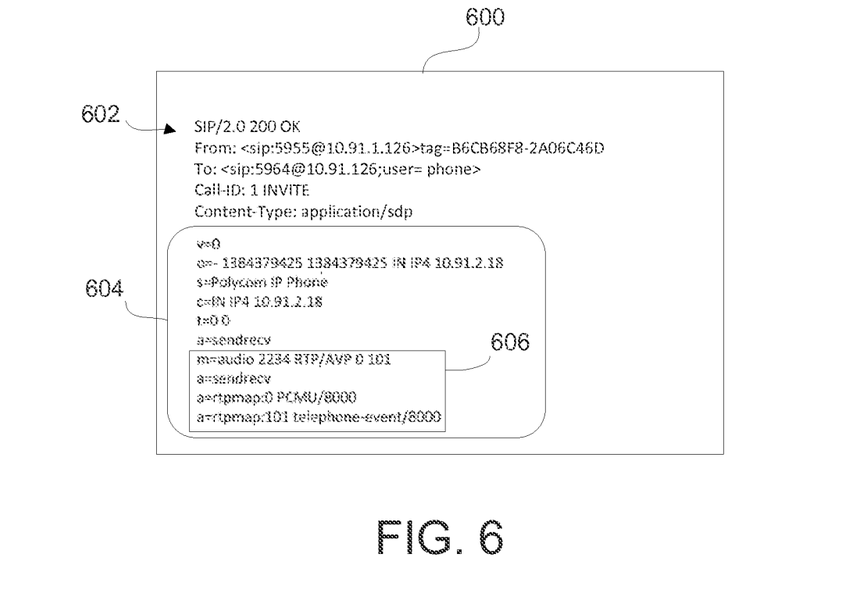
FIG. 6 illustrates a response message sent from an emergency call center that specifies the audio media type as the accepted media type for a communication session, in accordance with one or more implementations.

In FIG. 6, an exemplary response message 600 that may be received from the emergency call center 120 is shown. The response message 600 may include SIP syntax 602 over SDP syntax 604, and/or other information. For example, the SIP syntax 602 may include information such as "200 OK", which may be specify that a prior session invitation message that was received specified an acceptable media type. Otherwise, a response message may indicate "Unsupported media type" and/or other error message, rejection, and/or other information. The SIP syntax 602 may include other information (e.g., "TO" and/or "FROM" information, and/or other information). The SDP syntax 604 may include information such as a media type specification 606. The media type specification 606 in the response message 600 may determine the accepted media type for a session, and/or other information (e.g., to confirm the media type specified in a prior received session invitation message).

Returning to FIG. 1, the negotiation component 108 may be configured to effectuate changes in the media type specified in the session invitation messages, response messages, and/or other messages and/or information. The changes may be effectuated prior to effectuating transmission of a given session invitation message, response message, and/or other message to the emergency call center 120 and/or a given emergency calling device 118. For example, responsive to receiving session invitation messages that specify incoming emergency communication of the textual media type (e.g., a text message, MSRP text message, and/or other considerations), the negotiation component 108 may be configured to effectuate a change in session invitation messages to instead specify that the incoming emergency communication is of the audio media type (e.g., related to a voice call, an RTP media stream, and/or other considerations).

As another example, responsive to receiving response messages (e.g., response message 600 in FIG. 6) that specify the audio media type as the accepted media type for a session, the negotiation component 108 may be configured to effectuate a change in the response messages. The response messages may be changed to instead specify the textual media type as the accepted media type (e.g., response message 600 in FIG. 7).

As presented herein, a purpose of effectuating change to the media type specification of the session invitation messages, response message and/or other messages, may be to make a communication session "appear" to the emergency call center as being based on the audio media type (e.g., voice calls, RIP messages, and/or other considerations) and/or for the session to "appear" to the emergency calling devices 118 as being based on the textual media type. Once a session is established, the media content (e.g., text message) may be communicated without any actual change to the form, substance, and/or any other aspect of the incoming and/or outgoing content within the communication itself.

As an illustrative example, in FIG. 3, the negotiation component 108 may be configured to, responsive to reception of the first session invitation message 302 that specifies that incoming emergency communication for the first session is of the textual media type, effectuate a change 312 in the media type specification in the first session invitation message 302, and/or other changes. The change may include changing the media type specification to instead specify that the incoming emergency communication for the first session is of the audio media type (e.g., session invitation message 400 shown in FIG. 5, and/or other considerations), and/or other considerations.

In some implementations, the negotiation component 108 may be configured to effectuate one or more changes in the response messages received from the emergency call centers and/or other messages, and/or other considerations. For example, responsive to receiving the first response message 304 (e.g., response message 600 shown in FIG. 6, and/or other considerations) that specifies the audio media type as the accepted media type for the first session, the negotiation component 108 may be configured to effectuate a change in the media type specification in the first response message 304. This change may include changing the media type specification to instead specify the textual media type as the accepted media type for the first session (e.g., response message 600 shown in FIG. 7, and/or other considerations), and/or may include other changes and/or information.

Figure 5:
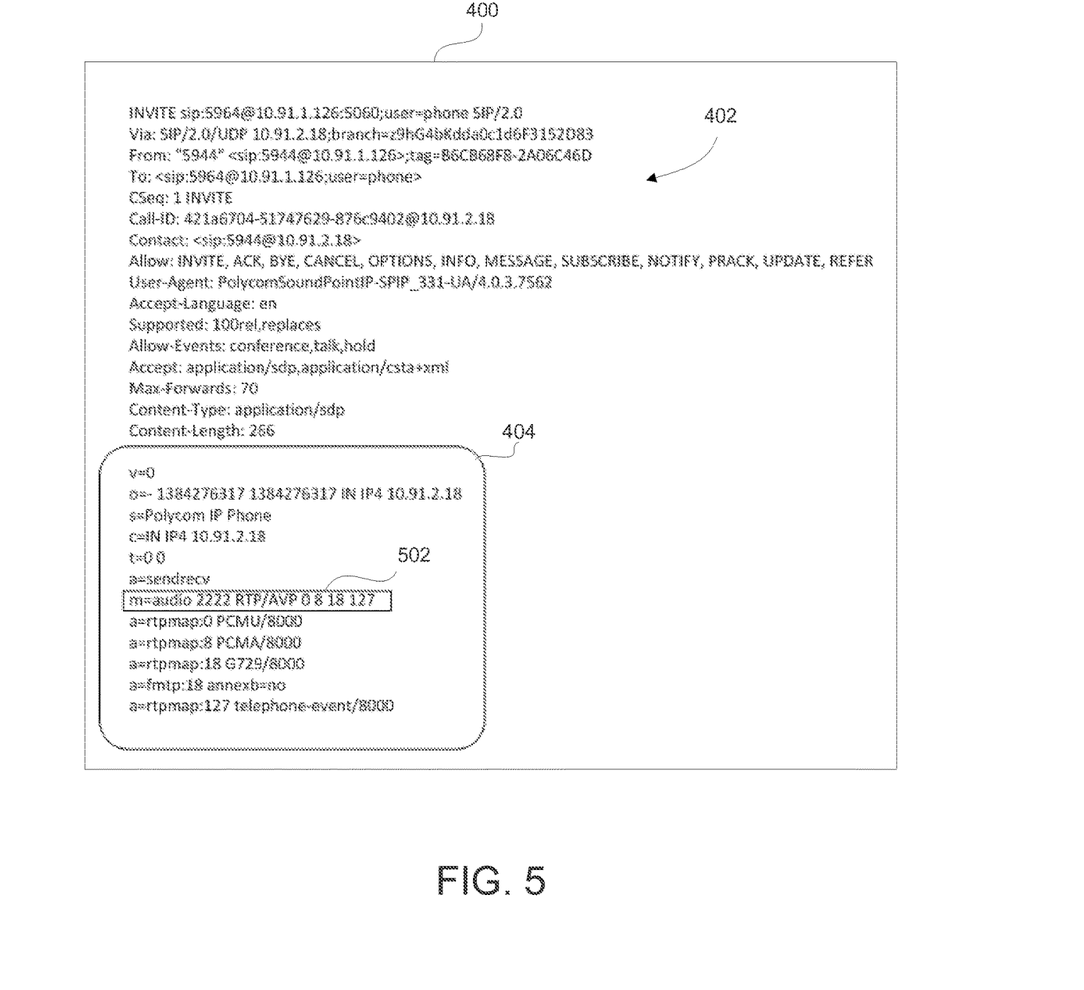
FIG. 5 illustrates a session invitation message that has been changed to instead specify the audio media type for an incoming emergency communication, in accordance with one or more implementations.

As an illustrative example in FIG. 5, an implementation of the session invitation message 400 is shown wherein the media type specification 502 in the SDP syntax 404 has been changed. Recall in FIG. 4, the media type specification 406 in the otherwise unchanged session invitation message 400 included information specifying the textual media type. However, the current media type specification 502 in the session invitation message 400 shown in FIG. 5 instead specifies the audio media type (e.g., more specifically, the RTP audio and/or voice call media type). The change may be effectuated by replacing, substituting, and/or otherwise redefining the information associated with the "m-line" identifier with replacement syntax and/or information related to the audio media type, and/or other considerations. Other information that may be changed may include, for example, one or more "a-line" information and/or other syntax and/or information included in the message 400, and/or other considerations. In some implementations, the change may be effectuated by replacing and/or substituting the entire SDP syntax 404 of the session invitation message 400, and/or other considerations. In some implementations, the change may be effectuated by replacing and/or substituting the entire message 400 with a new message, and/or other considerations. In any case, the session invitation message 400 specifying audio media type may be "accepted" and/or otherwise recognized by the emergency call center for establishing a communication session.

Figure 7:
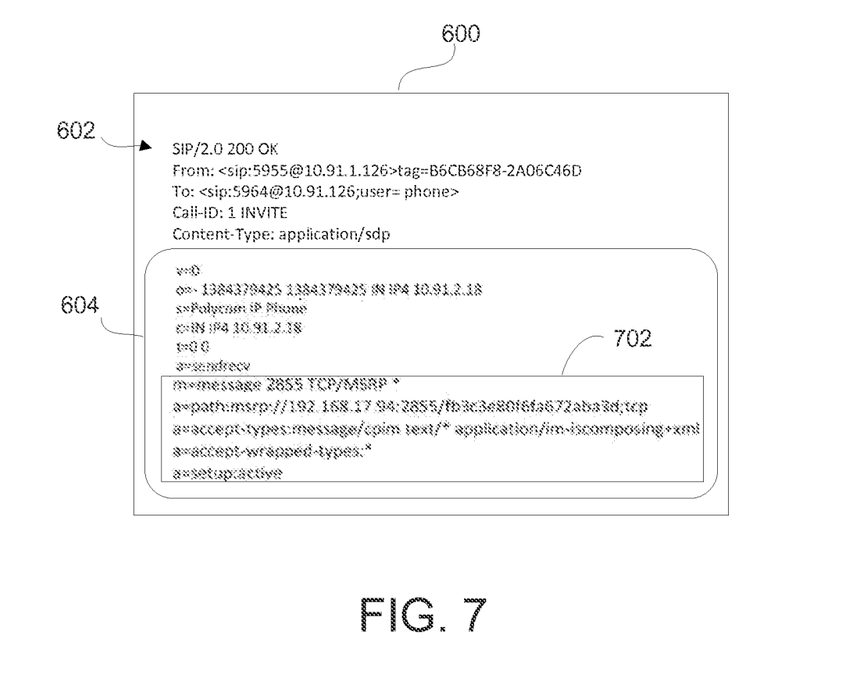
FIG. 7 illustrates a response message sent from an emergency call center that has been changed to specify the textual media type as the accepted media type for a communication session, in accordance with one or more implementations.

As an illustrative example in FIG. 7, an implementation of the response message 600 is shown wherein the media type specification 702 has been changed (e.g., recap the media type specification 606 in FIG. 6). For example, the media type specification 702 may be changed to recite the textual media type as the accepted media type (e.g., RTP and/or other considerations) for the communication session. The change may be effectuated by replacing, substituting, and/or otherwise redefining information associated with the "m-line" identifier and/or other information with replacement syntax and/or information related to the textual media type, and/or other considerations. Other information that may be changed may include, for example, one or more "a-line" information, and/or other syntax and/or information included in the message 600, and/or other considerations. In some implementations, the change may be effectuated by replacing and/or substituting the entire SDP syntax 604, and/or other considerations. In some implementations, the change may be effectuated by replacing and/or substituting the entire message 600 with a new message, and/or other considerations. In any case, the response message 600 specifying textual media type may then be "accepted" and/or otherwise recognized by the originating emergency calling device for establishing a communications session.

Returning to FIG. 1, the transmission component 110 may be configured to effectuate transmission of messages and/or other information to one or more of the emergency calling devices 118, emergency call center(s) 120, external resource(s) 114, and/or locations and/or destinations. For example, responsive to changes in media type specification being effectuated in one or more received session invitation messages, the transmission component 110 may be configured to effectuate transmission of the session invitation messages to the emergency call center 120. As another example, responsive to changes in media type specification being effectuated in the response messages received from the emergency call center 120, the transmission component 110 may be configured to effectuate transmission of the response messages to the appropriate originating emergency calling device 118. Transmission of the session invitation messages and/or the response messages may be effectuated via the one or more of the networks 116, and/or other considerations.

The transmission component 110 may be configured to, responsive to the communication sessions being established, effectuate transmission of one or more of the incoming emergency communications to the emergency call center 120, outgoing emergency communications to the appropriate emergency calling device 118, and/or effectuate transmission of other information. Transmission of the incoming and/or outgoing emergency communications may be effectuated via the one or more networks 116 and/or other considerations. In some implementations responsive to the communications sessions being established, the incoming and/or outgoing emergency communications may be communicated directly from the emergency calling devices 118 and emergency call center 120, and vice versa, via the one or more networks 116. This direct communication may or may not including relaying the messages through the one or more servers 102 (e.g., via the receiving component 106 and/or transmission component 110), and/or other considerations.

As an illustrative example, in FIG. 3, in some implementations, the transmission component 110 may be configured to, responsive to effectuating a change in the first session invitation message 302, effectuate transmission 316 of the first session invitation message 302 to the emergency call center. In some implementations, the transmission component 110 may be configured to, responsive to effectuating a change in the first response message 304, effectuate transmission 318 of the first response message 304 to the first wireless mobile device.

In some implementations, the transmission component 110 may be configured to, responsive to receiving the first acknowledgment message 306 from the first wireless mobile device, effectuate transmission of the first acknowledgement message 306 to the emergency call center. In some implementations, the transmission component 110 may be configured to, responsive to the first session being established and/or the first incoming communication 308 being received, effectuate transmission of the first incoming communication to the emergency call center 120. In some implementations, the transmission component 110 may be configured to, responsive to the first session being established and/or the first outgoing communication 310 being received, effectuate transmission of the first outgoing communication 310 to the first wireless mobile device.

Returning to FIG. 1, the establishing component 112 may be configured to establish and/or confirm the establishment of the communication sessions in accordance with the session invitation messages and/or response messages, and/or other considerations. For example, a session may be established once the acknowledgment messages have been received at the emergency call center 120, and/or other considerations. In some implementations, establishing component 112 may be configured to establish a session by maintaining an open communication channel between a given emergency calling device 118 and emergency call center 120. As an illustrative example in FIG. 3, the establishing component 112 may be configured to establish 326 the first session, confirm an establishment of the first session, and/or other considerations.

In some implementations, the establishing component 112 and/or other component may be configured to determine that a session has ended and/or that the session may be closed. For example, a session may be ended when a specified session termination message (not shown) is transmitted from one or both of the emergency calling devices 118, emergency call center 120, and/or other component and/or device. In some implementations, a session may be ended by virtue of a "time out" message and/or indication being determined, and/or other considerations. For example, a specified in-activity time period may be established that determines to end a session when a threshold time without communications being sent and/or received is reached, and/or other considerations.

Referring to FIG. 1, server(s) 102, emergency calling devices 118, and/or emergency call centers 120 may include electronic storage (e.g., electronic storage 113 in server(s) 102). Electronic storage may comprise electronic storage media that electronically stores information. The functionality of electronic storage may be similar among different instantiations, even if the stored information may be different. The electronic storage media of electronic storage 113 may include one or both of system storage that may be provided integrally (i.e., substantially non-removable) and/or removable storage that may be removably connectable. For example, electronic storage 113 may be removably connectable to server(s) 102 through, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from components of system 100, and/or other information that enables server(s) 102 and/or other components to function as described herein.

Server(s) 102 may include processor(s) 104. Processor(s) 104 may be configured to provide information processing capabilities in server(s) 102. The functionality of processor(s) 104 may be similar among different instantiations, even if the processing capabilities may be different. Processor(s) 104 may include one or more of a digital processor, an analog processor, a digital circuit designed to process information, an analog circuit designed to process information, and/or other mechanisms for electronically processing information. Although processor(s) 104 is shown in FIG. 1 as a single entity, this is for illustrative purposes only. In some implementations processor(s) 104 may include a plurality of processing units. These processing units may be physically located within the same device, or processor(s) 104 may represent processing functionality of a plurality of devices operating in coordination. The processor(s) 104 may be configured to execute components 106-112, and/or other components. Processor 104 may be configured to execute components 106-112, and/or other components by software; hardware; firmware; some combination of software, hardware, and/or firmware; and/or other mechanisms for configuring processing capabilities on processor(s) 104.

It should be appreciated that, although components 106-112 are illustrated in FIG. 1 as being co-located within a single processing unit, in implementations in which processor(s) 104 includes multiple processing units, one or more of components 106-112 may be located remotely from the other components. The description of the functionality provided by the different components 106-112 described below is for illustrative purposes, and is not intended to be limiting, as any of components 106-112 may provide more or less functionality than is described. For example, one or more of components 106-112 may be eliminated, and some or all of its functionality may be provided by other ones of components 106-112. As another example, processor 104 may be configured to execute one or more additional components that may perform some or all of the functionality attributed herein to one of components 106-112.

It is noted that the division of functionality between server(s) 102 is not intended to be limited by this disclosure. Functions described in relation with server(s) 102 may be performed and/or shared by one or more other components of system 100, including emergency call centers 120, and/or vice versa.

Figure 8:
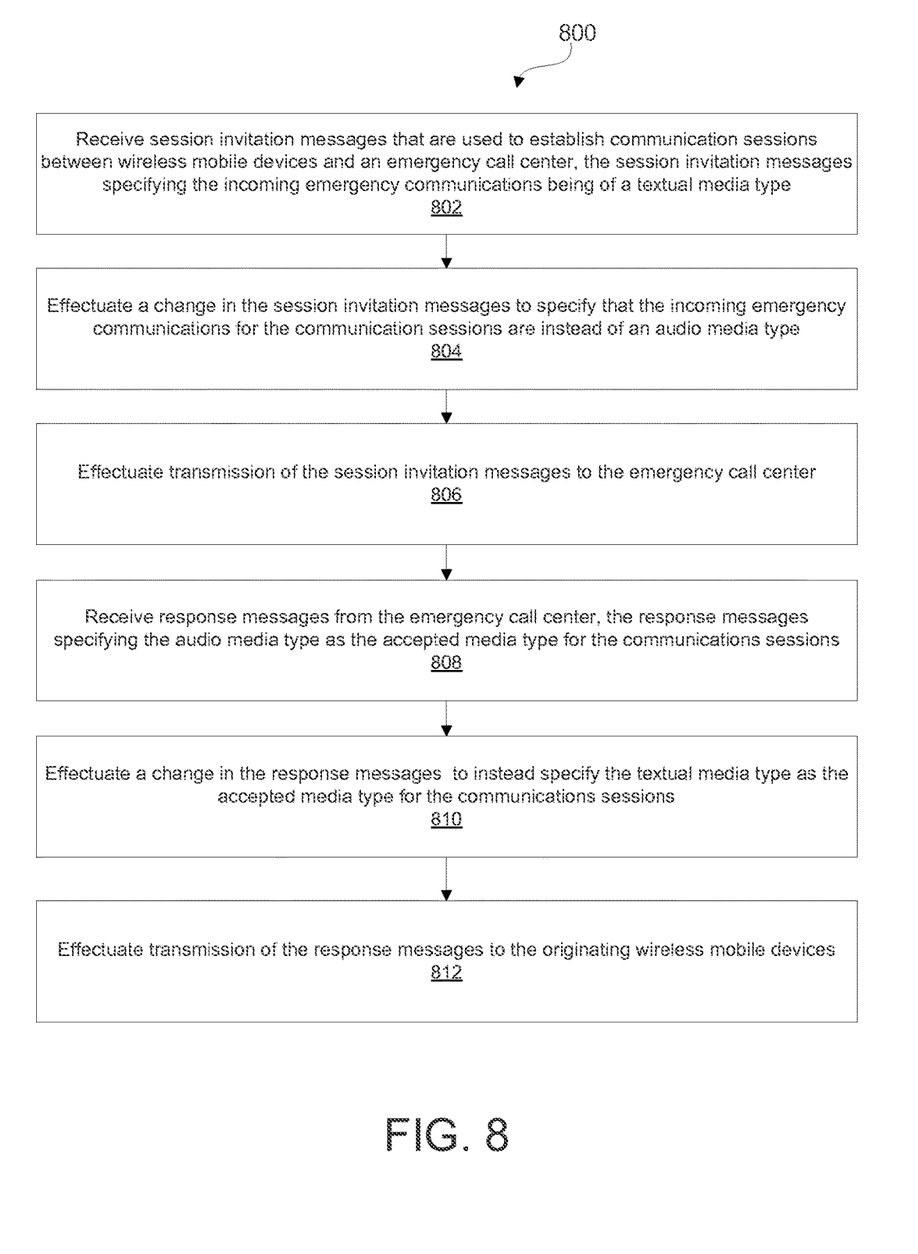
FIG. 8 illustrates a method of establishing a text communication session between an emergency calling device and an emergency call center, in accordance with one or more implementations.

FIG. 8 illustrates a method 800 for establishing text communication sessions between wireless mobile devices and an emergency call center. The operations of method 800 presented below are intended to be illustrative. In some implementations, method 800 may be accomplished with one or more additional operations not described, and/or without one or more of the operations discussed. Additionally, the order in which the operations of method 800 is illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

Referring to FIG. 8, at an operation 802, session invitation messages may be received. The session invitation messages may be associated with incoming emergency text messages being placed to an emergency call center. The session invitation messages may specify the incoming text communications as being a textual media type. In some implementations, operation 802 may be performed by a receiving component the same as or similar to receiving component 106 (shown in FIG. 1 and described herein).

At an operation 804, a change in the session invitation messages may be effectuated. The change may include changing the media type specification described in the session invitation messages. For example session invitation messages may be changed to instead specify that the incoming emergency communications for the communication sessions are of an audio media type. In some implementations, operation 804 may be performed by a negotiation component the same as or similar to negotiation component 108 (shown in FIG. 1 and described herein).

At an operation 806, session invitation messages may be transmitted to the emergency call center. In some implementations, operation 806 may be performed by a transmission component the same as or similar to transmission component 110 (shown in FIG. 1 and described herein).

At an operation 808, response messages may be received from the emergency call center. The response messages may specify the audio media type as the accepted media type for the communication session. In some implementations, operation 808 may be performed by a receiving component the same as or similar to receiving component 106 (shown in FIG. 1 and described herein).

At an operation 810, a change in the response messages may be effectuated. The change may include changing the accepted media type specified in the response messages. For example response message may be changed to instead specify the textual media type as the accepted media type. In some implementations, operation 810 may be performed by a negotiation component the same as or similar to negotiation component 108 (shown in FIG. 1 and described herein).

At an operation 812, the response messages may be transmitted to the originating wireless mobile device. In some implementations, operation 806 may be performed by a transmission component the same as or similar to transmission component 110 (shown in FIG. 1 and described herein).

Although the present technology has been described in detail for the purpose of illustration based on what is currently considered to be the most practical and preferred implementations it is to be understood that such detail is solely for that purpose and that the technology is not limited to the disclosed implementations, but, on the contrary, is intended to cover modifications and equivalent arrangements that are within the spirit and scope of the claims. For example, it is to be understood that the present technology contemplates that, to the extent possible, one or more features of any implementation can be combined with one or more features of any other implementation.

What is claimed is:

1. A system for establishing text communication sessions between wireless mobile devices and emergency call centers, the system comprising:
   a non-transitory computer readable storage medium having computer readable instructions embodied thereon; and
   one or more hardware processors configured by the computer readable instructions to:
   receive session invitation messages that are used to establish communication sessions between wireless mobile devices and an emergency call center, the session invitation messages specifying a media type of incoming emergency communications paced to the emergency call center from the wireless mobile devices;
   responsive to reception of a first session invitation message used to establish a first session between a first wireless mobile device and the emergency call center, in which the first session invitation message specifies that an incoming emergency communication for the first session is a textual media type, effectuate a change in the first session invitation message to specify that the incoming emergency communication for the first session is an audio media type;
   effectuate transmission of the first session invitation message to the emergency call center, and receive a first response message from the emergency call center, the first response message specifying the audio media type as an accepted media type for the incoming emergency communication received at the emergency call center during the first session; and
   effectuate a change in the first response message such that the first response message specifies the textual media type as the accepted media type for the incoming emergency communication received at the emergency call center during the first session, and effectuate transmission of the first response message to the first wireless mobile devices, wherein the transmission on the first response message facilitates establishing the first session, wherein effectuating the change in the first session invitation message comprises one or more of replacing, substituting, and/or redefining information associated with an m-line identifier or a-line information with replacement syntax and/or information related to a media type, the substituting including substituting a description in the first session invitation message that indicates the textual media type with a new description that indicates the audio media type, wherein the a-line shows path information and an accepted media type.

2. The system of claim 1, wherein the one or more processors are configured by computer readable instructions to:
   responsive to the first wireless mobile device receiving the first response message, receive a first acknowledgement message from the first wireless mobile device, and effectuate transmission of the first acknowledgement message to the emergency call center.

3. The system of claim 2, wherein the one or more processors are configured by computer readable instructions such that reception of the first acknowledgement message at the emergency call center establishes the first session.

4. The system of claim 1, wherein the one or more processors are configured by computer readable instructions such that the description in the first session invitation message that indicates the media type is associated with an identifier included in the first session invitation message.

5. The system of claim 1, wherein the one or more processors are configured by computer readable instructions such that the first session invitation message comprises an SIP over SDP message.

6. The system claim 1, wherein the one or more processors are configured by computer readable instructions such that the first response message comprises an SIP over SDP message.

7. The system claim 1, wherein the one or more processors are configured by computer readable instructions to:
   receive a first incoming emergency communication from the first wireless mobile device, and effectuate transmission of the first incoming emergency communication to the emergency call center based on the first session.

8. The system of claim 7, wherein the one or more processors are configured by computer-readable instructions such that the first incoming emergency communication is a text message.

9. The system of claim 1, wherein the one or more processors are configured by computer-readable instructions such that emergency call center comprises an Automated Call Distribution system.

10. A method of establishing text communication sessions between wireless mobile devices and emergency call centers, the method being implemented in a computer system including one or more physical processors and storage media storing machine-readable instructions, the method comprising:

receiving session invitation messages that are used to establish communication sessions between wireless mobile devices and an emergency call center, the session invitation messages specifying a media type of incoming emergency communications placed to the emergency call center from the wireless mobile devices;

responsive to reception of a first session invitation message used to establish a first session between a first wireless mobile device and the emergency call center, in which the first session invitation message specifies that an incoming emergency communication for the first session is of a textual media type, effectuating a change in the first session invitation message to specify that the incoming emergency communication for the first session is of an audio media type;

effectuating transmission the first session invitation message to the emergency call center, and receiving a first response message from the emergency call center, the first response message specifying the audio media type as an accepted media type for the incoming emergency communication received at the emergency call center during the first session; and effectuating a change in the first response message such that the first response message specifies the textual media type as the accepted media type for the incoming emergency communication received at the emergency call center during the first session, and effectuating transmission of the first response message to the first wireless mobile devices, wherein the transmission of the first response message facilitates establishing the first session, wherein effectuating the change in the first session invitation message comprises one or more of replacing, substituting, and/or redefining information associated with an m-line identifier or a-line information with replacement syntax and/or information related to a media type, the substituting including substituting a description in the first session invitation message that indicates the textual media type with a new description that indicates the audio media type, wherein the a-line shows path information and an accepted media type.

11. The method of claim 10, additionally comprising:

responsive to the first wireless mobile device receiving the first response message, receiving a first acknowledgement message from the first wireless mobile device, and effectuating transmission of the first acknowledgement message to the emergency call center.

12. The method of claim 11, wherein reception of the first acknowledgement message at the emergency call center establishes the first session.

13. The method of claim 10, wherein the description in the first session invitation message that indicates the media type is associated with an identifier included in the first session invitation message.

14. The method of claim 10, wherein the first session invitation message comprises an SIP over SDP message.

15. The method of claim 10, wherein the first responses message comprises an SIP over SDP message.

16. The method of claim 10, additionally comprising:

receiving a first incoming emergency communication from the wireless mobile device, and effectuating transmission of the first incoming emergency communication to the emergency call center based on the first session.

17. The method of claim 16, wherein the first incoming emergency communication is a text message.

18. The method of claim 10, wherein the emergency call center comprises an Automated Call Distribution system.

* * * * *